US010884642B2

(12) United States Patent
Yang et al.

(10) Patent No.: US 10,884,642 B2
(45) Date of Patent: Jan. 5, 2021

(54) METHOD AND APPARATUS FOR PERFORMING DATA-ACCESSING MANAGEMENT IN A STORAGE SERVER

(71) Applicant: Silicon Motion Inc., Hsinchu County (TW)

(72) Inventors: Tsung-Chieh Yang, Hsinchu (TW); Wen-Long Wang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 85 days.

(21) Appl. No.: 16/365,695

(22) Filed: Mar. 27, 2019

(65) Prior Publication Data

US 2020/0310666 A1 Oct. 1, 2020

(51) Int. Cl.
*G06F 3/06* (2006.01)
*G06F 9/54* (2006.01)

(52) U.S. Cl.
CPC .......... *G06F 3/0641* (2013.01); *G06F 3/0608* (2013.01); *G06F 3/0653* (2013.01); *G06F 3/0683* (2013.01); *G06F 9/542* (2013.01)

(58) Field of Classification Search
None
See application file for complete search history.

(56) References Cited

U.S. PATENT DOCUMENTS

2010/0329254 A1* 12/2010 Chen ....................... H04L 12/18 370/390
2011/0060759 A1 3/2011 Fienblit
2014/0304464 A1* 10/2014 Bert ...................... G06F 3/0611 711/105
2015/0254003 A1* 9/2015 Lee ..................... G06F 12/0246 711/103

FOREIGN PATENT DOCUMENTS

TW 200823683 6/2008
TW 201342052 A 10/2013
TW 201443647 A 11/2014
TW 201523303 A 6/2015
TW 201729068 A 8/2017
TW 201826285 A 7/2018
TW 201837731 A 10/2018
TW 201839775 A 11/2018
WO 2016/147281 A1 9/2016

* cited by examiner

*Primary Examiner* — Tracy C. Chan

(74) *Attorney, Agent, or Firm* — Winston Hsu

(57) ABSTRACT

A method for performing data-accessing management in a storage server and associated apparatus such as a host device, a storage device, etc. are provided. The method includes: in response to a client request of writing a first set of data into the storage server, utilizing the host device within the storage server to trigger broadcasting an internal request corresponding to the client request toward each storage device of a plurality of storage devices within the storage server; and in response to the internal request corresponding to the client request, utilizing said each storage device of the plurality of storage devices to search for the first set of data in said each storage device to determine whether the first set of data has been stored in any storage device, for controlling the storage server completing the client request without duplication of the first set of data within the storage server.

28 Claims, 12 Drawing Sheets

METHOD AND APPARATUS FOR PERFORMING DATA-ACCESSING MANAGEMENT IN A STORAGE SERVER

BACKGROUND OF THE INVENTION

1. Field of the Invention

The present invention is related to data storage, and more particularly, to a method and apparatus for performing data-accessing management in a storage server, where examples of the apparatus may include, but are not limited to: a host device, a storage device, etc.

2. Description of the Prior Art

A storage server equipped with multiple storage devices may be helpful on enhancing feasibility of data storage. While storage space is created through such architecture, some problems may occur, however. As user data may vary, certain types of data may be received to be stored in the storage server, and performing data compression on these types of data may be time consuming, causing the overall performance of the storage server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method for performing data-accessing management in a storage server, and to provide associated apparatus such as a host device, a storage device, etc., in order to solve the above-mentioned problems.

It is another objective of the present invention to provide a method for performing data-accessing management in a storage server, and to provide associated apparatus such as a host device, a storage device, etc., in order to achieve an optimal performance without introducing a side effect or in a way that less likely to introduce a side effect.

At least one embodiment of the present invention provides a method for performing data-accessing management in a storage server, wherein the method is applied to the storage server. The method may comprise: in response to a client request of writing a first set of data into the storage server, utilizing a host device within the storage server to trigger broadcasting an internal request corresponding to the client request toward each storage device of a plurality of storage devices within the storage server, wherein the storage server comprises the host device and the plurality of storage devices that are coupled to the host device, the host device is arranged to control operations of the storage server, and the plurality of storage devices are arranged to store information for the storage server; and in response to the internal request corresponding to the client request, utilizing said each storage device of the plurality of storage devices to search for the first set of data in said each storage device, to determine whether the first set of data has been stored in any storage device of the plurality of storage devices, for controlling the storage server completing the client request without duplication of the first set of data within the storage server.

In addition to the above method, the present invention also provides a host device. The host device may comprise a control circuit that is arranged to control the host device to perform data-accessing management in a storage server, wherein the storage server comprises the host device and a plurality of storage devices that are coupled to the host device, the host device is arranged to control operations of the storage server, and the plurality of storage devices are arranged to store information for the storage server. For example, in response to a client request of writing a first set of data into the storage server, the host device triggers broadcasting an internal request corresponding to the client request toward each storage device of the plurality of storage devices. In addition, through the internal request corresponding to the client request, the host device controls said each storage device of the plurality of storage devices to search for the first set of data in said each storage device to determine whether the first set of data has been stored in any storage device of the plurality of storage devices, for controlling the storage server completing the client request without duplication of the first set of data within the storage server.

In addition to the above method, the present invention also provides a storage device, and the storage device may comprise a non-volatile (NV) memory and a memory controller, wherein the NV memory may comprise at least one NV memory element (e.g. one or more NV memory elements). The memory controller is arranged to control accessing of the NV memory to allow a host device to access the NV memory through the memory controller, for performing data-accessing management in a storage server, wherein the storage server comprises the host device and a plurality of storage devices that are coupled to the host device, the host device is arranged to control operations of the storage server, and the plurality of storage devices are arranged to store information for the storage server. For example, in response to a client request of writing a first set of data into the storage server, the host device triggers broadcasting an internal request corresponding to the client request toward each storage device of the plurality of storage devices, wherein the plurality of storage devices comprise the storage device. In addition, in response to the internal request corresponding to the client request, said each storage device of the plurality of storage devices searches for the first set of data in said each storage device to determine whether the first set of data has been stored in any storage device of the plurality of storage devices, for controlling the storage server completing the client request without duplication of the first set of data within the storage server.

In addition to the above method, the present invention also provides a controller of a storage device, where the storage device comprises the controller and a NV memory. The NV memory may comprise at least one NV memory element (e.g. one or more NV memory elements). In addition, the controller comprises a processing circuit that is arranged to control operations of the controller for controlling accessing of the NV memory, to allow a host device to access the NV memory through the controller, for performing data-accessing management in a storage server, wherein the storage server comprises the host device and a plurality of storage devices that are coupled to the host device, the host device is arranged to control operations of the storage server, and the plurality of storage devices are arranged to store information for the storage server. For example, in response to a client request of writing a first set of data into the storage server, the host device triggers broadcasting an internal request corresponding to the client request toward each storage device of the plurality of storage devices, wherein the plurality of storage devices comprise the storage device. In addition, in response to the internal request corresponding to the client request, said each storage device of the plurality of storage devices searches for the first set of data in said each storage device to determine whether the first set of data has been stored in any storage device of the plurality of storage devices, for controlling the storage server completing the client request without duplication of the first set of data within the storage server.

The present invention method and associated apparatus can guarantee that the whole storage server (e.g. the host device and the storage devices) can operate properly, to prevent problems in the related art, such as hardware resource full-load/overload. In addition, implementing according to the embodiments of the present invention does not significantly increase additional costs. More particularly, manufacturers of the controllers (such as the memory controllers) within the storage devices do not need to implement a new hardware architecture of the controllers, and the associated costs of designing and fabricating a new integrated circuit (IC) corresponding to the new hardware architecture can be saved. Therefore, the related art problems can be solved, and the overall cost will not increase too much. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing data-accessing management in a storage server, and the apparatus may comprise at least one portion (e.g. a portion or all) of the storage server. For example, the apparatus may comprise a portion of the storage server, such as a host device within the storage server or an associated control circuit positioned within the host device (e.g. a processing circuit running one or more program modules corresponding to the method, and a storage interface circuit comprising one or more sub-circuits corresponding to the method), or a storage device within the storage server or an associated controller positioned within the storage device (e.g. a memory controller that operate according to the method). In another example, the apparatus may comprise the whole of the storage server.

Figure 1:
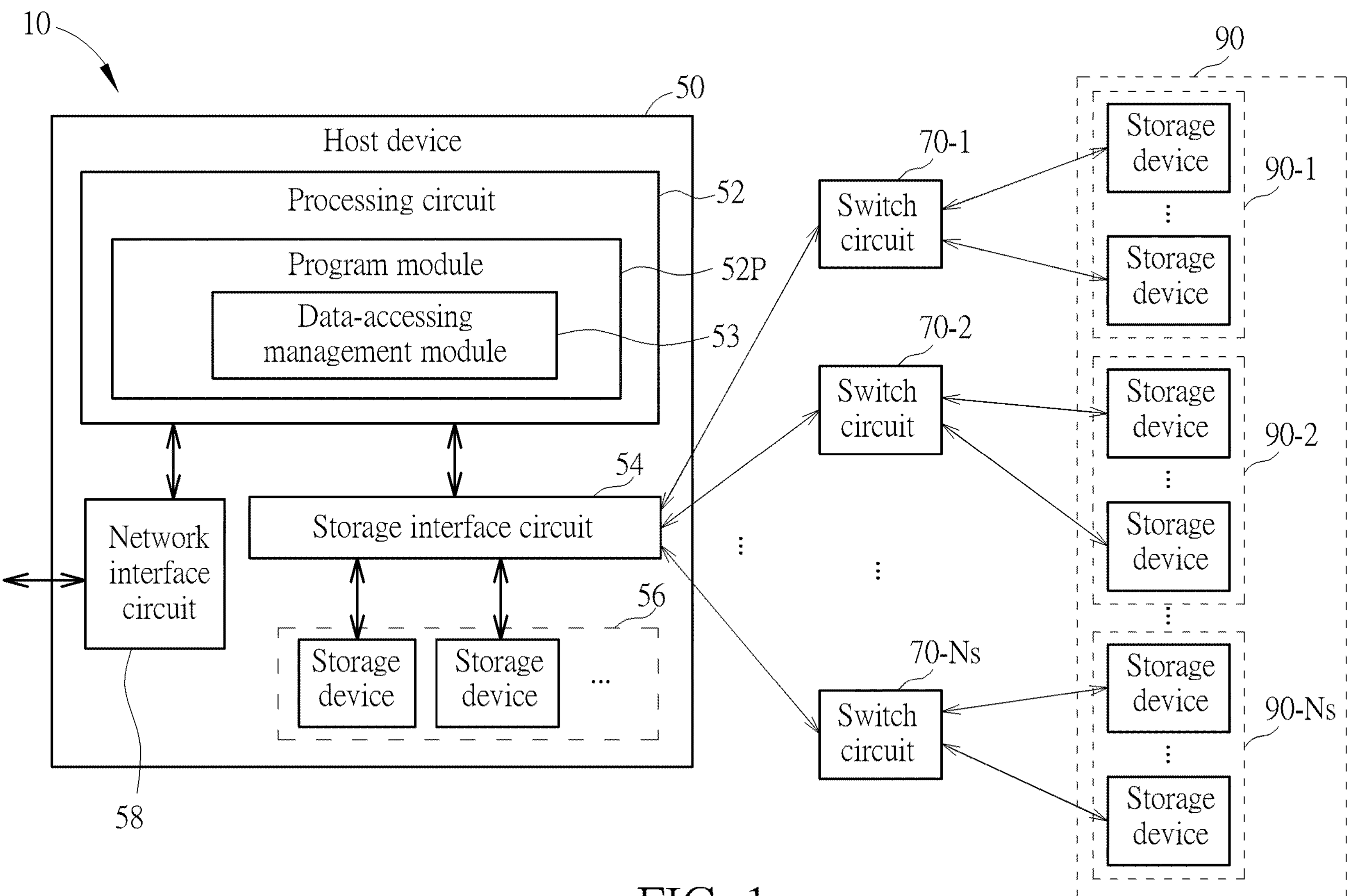
FIG. 1 is a diagram of a storage server according to an embodiment of the present invention.

FIG. 1 is a diagram of a storage server 10 according to an embodiment of the present invention. The storage server 10 may comprise a host device 50, at least one switch circuit (e.g. one or more switch circuits) such as Ns switch circuits 70-1, 70-2, . . . , and 70-Ns, and a plurality of storage devices 90. The plurality of storage devices 90 are coupled to the host device 50 through the aforementioned at least one switch circuit such as the Ns switch circuits 70-1, 70-2, . . . , and 70-Ns. More particularly, the plurality of storage devices 90 may comprise Ns sets of storage devices 90-1, 90-2, . . . , and 90-Ns, and the Ns sets of storage devices 90-1, 90-2, . . . , and 90-Ns may be coupled to the host device 50 through the Ns switch circuits 70-1, 70-2, . . . , and 70-Ns, respectively. According to this embodiment, the host device 50 may be arranged to control operations of the storage server 10, and the plurality of storage devices 90 may be arranged to store information for the storage server 10.

As shown in FIG. 1, the host device 50 may comprise a processing circuit 52 (e.g. at least one processor and associated circuits such as Random Access Memory (RAM), bus, etc.) for controlling operations of the host device 50, at least one storage interface circuit 54 for coupling the switch circuits 70-1, 70-2, . . . , and 70-Ns and for coupling storage or memory devices (e.g. one or more Hard Disk Drive (HDDs) and/or one or more Solid State Drives (SSDs)) at the host device 50, and a network interface circuit 58 for coupling the host device 50 to at least one network. The storage or memory devices may comprise at least one storage device such as one or more storage devices, which may be collectively referred to as the storage device 56. For example, the storage device 56 may comprise a set of storage devices, where one of them may be utilized as a system disk of the host device 50, and the others may be arranged to store user data for the host device 50, but the present invention is not limited thereto. According to this embodiment, the processing circuit 52 running program modules 52P (more particularly, a data-accessing management module 53 corresponding to the method) may be arranged to control operations of the host device 50 according to the method, for example, control the host device 50 to perform data-accessing management in the storage server 10, and the storage interface circuit 54 may conform to one or more specifications (e.g. one or more of Serial Advanced Technology Attachment (Serial ATA, or SATA) specification, Peripheral Component Interconnect (PCI) specification, Peripheral Component Interconnect Express (PCIe) specification, Non-Volatile Memory Express (NVMe) specification, NVMe-over-Fabrics (NVMeoF) specification, Small Computer System Interface (SCSI) specification, etc.), and may perform communications according to the one or more specifications, to allow the processing circuit 52 running the program modules 52P to access the storage device 56 and the plurality of storage devices 90 through the storage interface circuit 54. In addition, the network interface circuit 58 may be arranged to provide wired or wireless network connections, and one or more client devices corresponding to one or more users may access (e.g. read or write) user data in the storage server 10 (e.g. the storage device 56 and the plurality of storage devices 90 therein) through the wired or wireless network connections. For better comprehension, the host device 50 and the associated circuits/modules/devices in the architecture shown in the left-hand side of FIG. 1 (e.g. the processing circuit 52 running the program modules 52P, and the storage interface circuit 54) may be taken as examples of the aforementioned host device and the associated circuits/modules/devices thereof (e.g. the processing circuit running the one or more program modules corresponding to the method, and the storage interface circuit comprising the one or more sub-circuits corresponding to the method), respectively.

According to some embodiments, the processing circuit 52 running the program modules 52P or the storage interface circuit 54 may configure at least one portion (e.g. a portion or all) of the plurality of storage devices 90 to forma storage pool architecture, but the present invention is not limited thereto. According to some embodiments, the processing circuit 52 running the program modules 52P or the storage interface circuit 54 may configure at least one portion (e.g. a portion or all) of the plurality of storage devices 90 to forma Redundant Array of Independent Disks (RAID) of the storage server 10, such as an All Flash Array (AFA).

Figure 2:
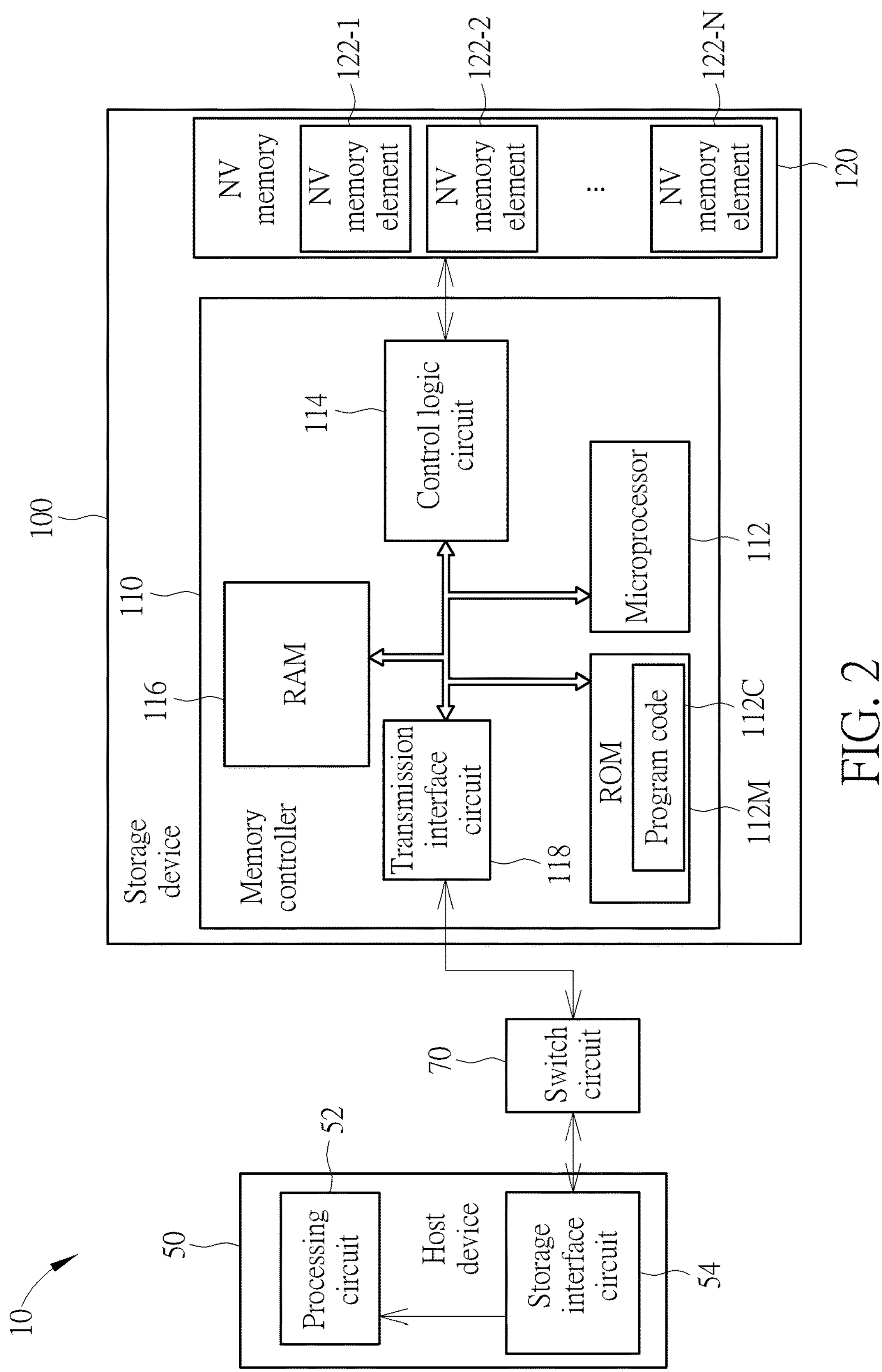
FIG. 2 illustrates some implementation details of a storage device within the storage server shown in FIG. 1 according to an embodiment of the present invention.

FIG. 2 illustrates some implementation details of a storage device 100 within the storage server 10 shown in FIG. 1 according to an embodiment of the present invention, where the storage device 100 can be taken as an example of any of the plurality of storage devices 90. More particularly, each of the plurality of storage devices 90 may be implemented according to the architecture of the storage device 100, but the present invention is not limited thereto. In addition, the aforementioned at least one switch circuit (e.g. one or more switch circuits) such as Ns switch circuits 70-1, 70-2, . . . , and 70-Ns may be collectively referred to as the switch circuit 70.

The storage device 100 may be arranged for providing the host device 50 with storage space. Under control of the host device 50, the one or more client devices may assess (e.g. read or write) user data in the storage space. Examples of the host device 50 may include, but are not limited to: a personal computer such as a desktop computer and a laptop computer. Examples of the storage device 100 may include, but are not limited to: an SSD, and various types of embedded memory devices such as that conforming to the PCIe specification. According to this embodiment, the storage device 100 may comprise a controller such as a memory controller 110, and may further comprise a non-volatile (NV) memory 120, where the controller is arranged to control operations of the storage device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

According to this embodiment, the memory controller 110 may be arranged to control the accessing of the flash memory 120, to allow the host device 50 to access the NV memory 120 through the memory controller 110, for performing data-accessing management in the storage server 10. As shown in FIG. 2, the memory controller 110 may comprise a processing circuit such as a microprocessor 112, a storage unit such as a read-only memory (ROM) 112M, a control logic circuit 114, a RAM 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the read-only memory 112M of this embodiment is arranged to store a program code 112C, and the microprocessor 112 is arranged to execute the program code 112C to control operations of the memory controller 110 for controlling the accessing of the flash memory 120, to allow the host device 50 to access the NV memory 120 through the memory controller 110, for performing data-accessing management in the storage server 10. Note that, in some examples, the program code 112C may be stored in the RAM 116 or any type of memory. Further, the control logic circuit 114 may be arranged to control the flash memory 120, and may comprise a data protection circuit (not shown) for protecting data and/or performing error correction, but the present invention is not limited thereto. The transmission interface circuit 118 may conform to a specific communications specification (e.g. the PCIe specification), and may perform communications according to the specific communications specification, for example, perform communications with the host device 50 for the storage device 100, where the storage interface circuit 54 and the switch circuit 70 may conform to the specific communications specification (e.g. the PCIe specification), for performing communications with the storage device 100 for the host device 50. For example, the switch circuit 70 (e.g. the aforementioned at least one switch circuit) may be implemented as at least one PCIe switch circuit (e.g. one or more PCIe switch circuits), but the present invention is not limited thereto. According to some embodiments, each of the switch circuits 70-1, 70-2, . . . , and 70-Ns may be implemented as a PCIe switch circuit.

According to some embodiments, the host device 50 may transmit host commands and corresponding logical addresses to the memory controller 110 through the switch circuit 70 to access the storage device 100. The memory controller 110 receives the host commands and the logical addresses, and translates the host commands into memory operating commands (which may be simply referred to as operating commands), and further controls the NV memory 120 with the operating commands to perform reading, writing/programing, etc. on memory units (e.g. data pages) having physical addresses within the flash memory 120, where the physical addresses correspond to the logical addresses. When the memory controller 110 perform an erase operation on any NV memory element 122-*n* of the plurality of NV memory elements 122-1, 122-2, . . . , and 122-N (in which "n" may represent any integer in the interval [1, N]), at least one block of multiple blocks of the NV memory element 122-*n* may be erased, where each block of the blocks may comprise multiple pages (e.g. data pages), and an access operation (e.g. reading or writing) may be performed on one or more pages.

Figure 3:
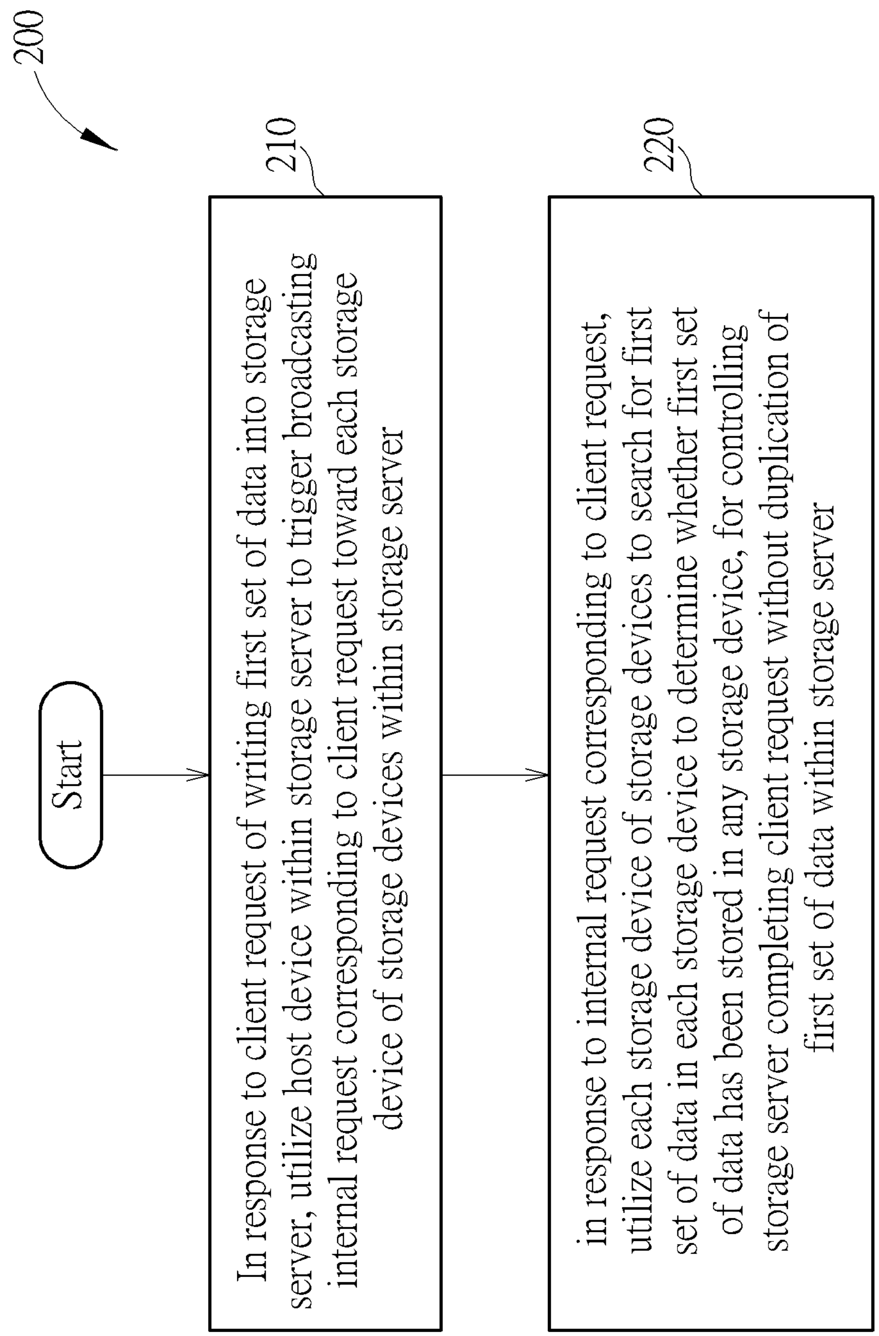
FIG. 3 is a working flow of a method for performing data-accessing management in a storage server according to an embodiment of the present invention.

FIG. 3 is a working flow 200 of the method for performing data-accessing management in the storage server according to an embodiment of the present invention. The method can be applied to the storage server 10, and more particularly, can be applied to the host device 50 comprising the processing circuit 52 running the program modules 52P (e.g. the data-accessing management module 53 corresponding to the method), the switch circuits 70-1, 70-2, . . . , and 70-Ns, and each of the plurality of storage devices 90, such as the storage device 100 comprising the memory controller 110, where the control circuit such as the processing circuit 52 running the data-accessing management module 53 may control the host device 50 to operate according to the method.

In Step 210, in response to a client request of writing a first set of data DATA1 into the storage server 10, utilize the host device 50 within the storage server 10 to trigger broadcasting an internal request corresponding to the client request toward each storage device of the plurality of storage devices 90 within the storage server 10, such as the storage device 100. For example, the host device 50 may receive the client request from a client device such as any of the one or more client devices, and more particularly, may receive a plurality of client requests comprising this client request from the one or more client devices. According to this embodiment, the storage server 10 may comprise the aforementioned at least one switch circuit (e.g. the switch circuits 70-1, 70-2, . . . , and 70-Ns) coupled between the host device 50 and the plurality of storage devices 90, and the aforementioned at least one switch circuit (e.g. the switch circuits 70-1, 70-2, . . . , and 70-Ns) may broadcast and send the internal request to all of the plurality of storage devices 90. For example, in a situation where the host device 50, the aforementioned at least one switch circuit (e.g. the switch circuits 70-1, 70-2, . . . , and 70-Ns), and the plurality of storage devices 90 at least conform to the PCIe specification, the aforementioned at least one switch circuit (e.g. the switch circuits 70-1, 70-2, . . . , and 70-Ns) may send the internal request to all of the plurality of storage devices 90 through a broadcast function of the aforementioned at least one switch circuit, but the present invention is not limited thereto.

In Step 220, in response to the internal request corresponding to the client request, utilize the aforementioned each storage device of the plurality of storage devices, such as the storage device 100, to search for the first set of data DATA1 in the aforementioned each storage device (e.g. the storage device 100) to determine whether the first set of data DATA1 has been stored in any storage device of the plurality of storage devices 90 (e.g. the storage device 100), for controlling the storage server 10 completing the client request without duplication of the first set of data DATA1 within the storage server 10. According to this embodiment, the internal request may comprise a specific command, and the aforementioned each storage device (e.g. the storage device 100) may execute the specific command. For example, after the internal request corresponding to the client request is broadcasted toward the plurality of storage devices 90, all of the plurality of storage devices 90 (e.g. the storage device 100) may execute the specific command. In addition, in response to the specific command within the internal request, the aforementioned any storage device (e.g. the storage device 100) may execute the specific command to perform a detection operation of the first set of data DATA1 on existing information stored in the aforementioned any storage device (e.g. the storage device 100) to generate a detection result, where the detection result may indicate whether the first set of data DATA1 has been stored in the aforementioned any storage device (e.g. the storage device 100). For example, in a situation where the host device 50 and the plurality of storage devices 90 at least conform to the PCIe specification, the specific command may be a compare command conforming to the NVMe specification, or a verify command conforming to the SATA specification or Parallel ATA (PATA) specification, but the present invention is not limited thereto.

According to this embodiment, if the first set of data DATA1 has been stored in any of the plurality of storage devices 90 (e.g. the storage device 100), the storage server 10 may complete the client request without writing the first set of data DATA1 into the plurality of storage devices 90 again, otherwise, the storage server 10 may complete the client request by writing the first set of data DATA1 into one of the plurality of storage devices 90 (e.g. the storage device 100).

For better comprehension, the method may be illustrated with the working flow 200, but the present invention is not limited thereto. According to some embodiments, one or more steps may be added, deleted, or changed in the working flow 200.

Figure 4:
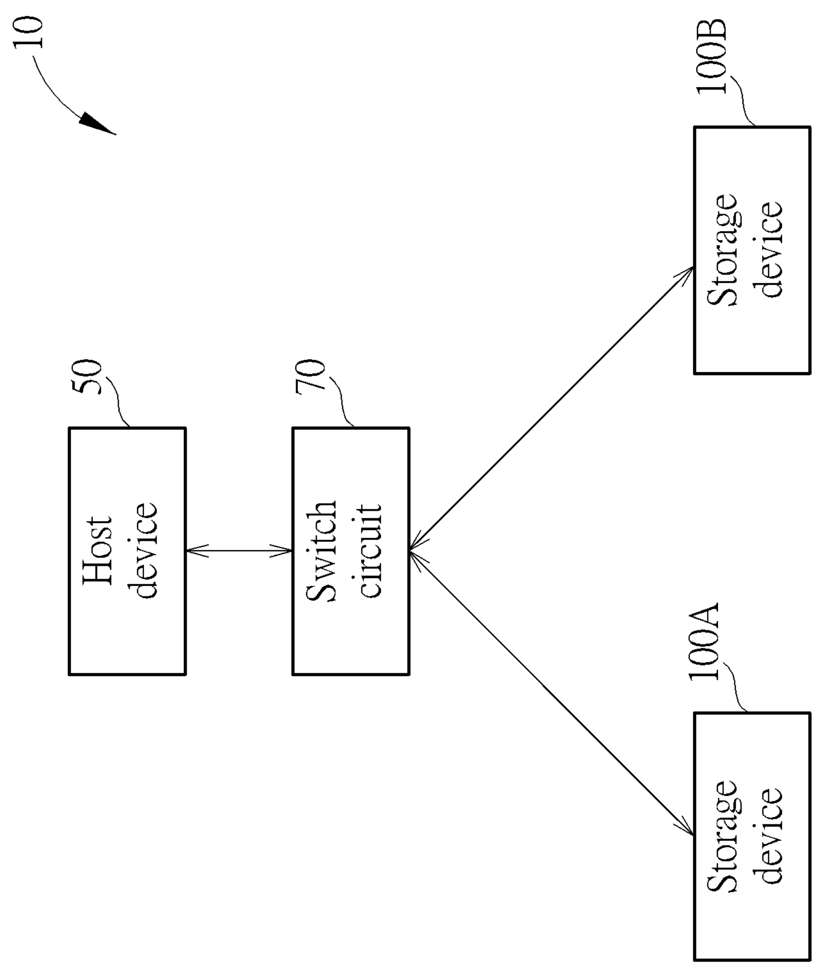
FIG. 4 illustrates two storage devices involved with the method according to an embodiment of the present invention.

FIG. 4 illustrates two storage devices 100A and 100B involved with the method according to an embodiment of the present invention, where the storage devices 100A and 100B can be taken as examples of any two of the plurality of storage devices 90. Each of the storage devices 100A and 100B may be implemented according to the architecture of the storage device 100, but the present invention is not limited thereto.

The method can be applied to the host device 50 and the plurality of storage devices 90 (e.g. the storage device 100), and therefore can be applied to the storage devices 100A and 100B. More particularly, in response to the client request of writing the first set of data DATA1 into the storage server 10, the host device 50 may trigger broadcasting the internal request corresponding to the client request toward the aforementioned each storage device of the plurality of storage devices 90, such as the storage devices 100A and 100B. According to this embodiment, the switch circuit 70 may broadcast and send the internal request to the plurality of storage devices 90 comprising the storage devices 100A and 100B. For example, in a situation where the host device 50, the switch circuit 70, and the plurality of storage devices 90 comprising the storage devices 100A and 100B at least conform to the PCIe specification, the switch circuit 70 may send the internal request to the plurality of storage devices 90 comprising the storage devices 100A and 100B through the broadcast function of the switch circuit 70.

In addition, through the internal request corresponding to the client request, the host device 50 may control the aforementioned each storage device such as each of the storage devices 100A and 100B to search for the first set of data DATA1 in the aforementioned each storage device (e.g. each of the storage devices 100A and 100B) to determine whether the first set of data DATA1 has been stored in any storage device of the plurality of storage devices 90 (e.g. each of the storage devices 100A and 100B), for controlling the storage server 10 completing the client request without duplication of the first set of data DATA1 within the storage server 10. According to this embodiment, the aforementioned each storage device such as each of the storage devices 100A and 100B may execute the specific command. In response to the specific command within the internal request, the storage device 100A may execute the specific command to perform a detection operation of the first set of data DATA1 on existing information stored in the storage device 100A to generate a detection result of the storage device 100A, and the storage device 100B may execute the specific command to perform a detection operation of the first set of data DATA1 on existing information stored in the storage device 100B to generate a detection result of the storage device 100B, where the detection result of the storage device 100A may indicate whether the first set of data DATA1 has been stored in the storage device 100A, and the detection result of the storage device 100B may indicate whether the first set of data DATA1 has been stored in the storage device 100B. For example, the specific command may be the compare command conforming to the NVMe specification, or the verify command conforming to the SATA specification or the PATA specification.

According to some embodiments, the storage server 10 may receive a first write request WR1 and a second write request WR2 from outside the storage server 10, and the client request mentioned in Step 210 may represent any of the first write request WR1 and the second write request WR2. For example, the storage server 10 may receive the first write request WR1 and the second write request WR2 from the one or more client devices. The host device 50 may trigger broadcasting a first internal request IR1 and a second internal request IR2 respectively corresponding to the first write request WR1 and the second write request WR2 toward the aforementioned each storage device of the plurality of storage devices (e.g. each of the storage devices 100A and 100B), and the internal request may represent one of the first and the second internal requests IR1 and IR2 that corresponds to the aforementioned any of the first write request WR1 and the second write request WR2.

More particularly, the first internal request IR1 and the second internal request IR2 respectively corresponding to the first write request WR1 and the second write request WR2 may be arranged to write the first set of data DATA1 at different logical block addresses (LBAs), respectively. For example, the first internal request IR1 may be arranged to write the first set of data DATA1 at a first LBA into the storage device 100A, and the second internal request IR2 may be arranged to write the first set of data DATA1 at a second LBA into the storage device 100B. In some of the following embodiments, the storage device 100A and the storage device 100B may be respectively referred to as the storage device A and the storage device B for brevity. In addition, LBAs LBA1 and LBA17 that are different from each other may be taken as examples of the first LBA and the second LBA, respectively, and therefore, the first internal request IR1 and the second internal request IR2 may be respectively described as the first internal request IR1 (A, DATA1, LBA1) and the second internal request IR2 (B, DATA1, LBA17) for better comprehension, but the present invention is not limited thereto.

Figure 5:
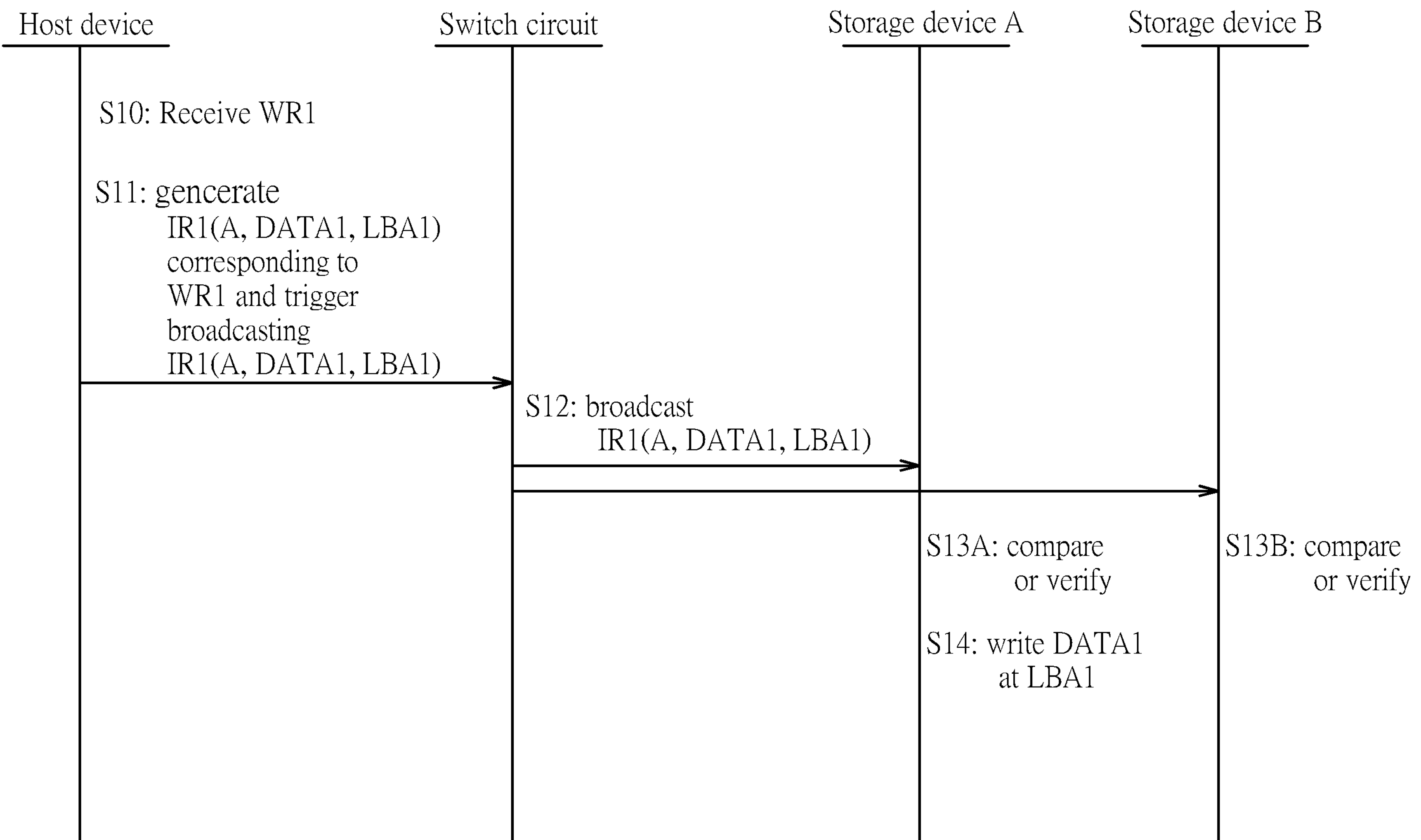
FIG. 5 illustrates a write control scheme of the method according to an embodiment of the present invention.

FIG. 5 illustrates a write control scheme of the method according to an embodiment of the present invention. For example, the plurality of client requests may comprise the first write request WR1. The first write request WR1 may be arranged to write the first set of data DATA1 at the first LBA such as LBA1, and the first internal request IR1 (A, DATA1, LBA1) may indicate writing the first set of data DATA1 at the first LBA LBA1 into the storage device A within the plurality of storage devices 90.

In Step S10, the storage server 10 may receive the first write request WR1.

In Step S11, the host device 50 may generate the first internal request IR1 (A, DATA1, LBA1) corresponding to the first write request WR1 and trigger broadcasting the first internal request IR1 (A, DATA1, LBA1).

In Step S12, the switch circuit 70 may broadcast the first internal request IR1 (A, DATA1, LBA1), and more particularly, send the first internal request IR1 (A, DATA1, LBA1) to both of the storage device A and the storage device B.

In Step S13A, through executing the specific command such as the compare command or the verify command, the storage device A may compare or verify, for example, compare the first set of data DATA1 with the existing information stored in the storage device A or verify existence of the first set of data DATA1 in the storage device A. According to this embodiment, in response to the first internal request IR1 (A, DATA1, LBA1), the storage server 10 may utilize the storage device A to perform a first detection operation of the first set of data DATA1 on the existing information stored in the storage device A (e.g. by executing the specific command such as the compare command or the verify command) to generate a first detection result, where the first detection result may indicate whether the first set of data DATA1 has been stored in the storage device A. For example, the first detection result may indicate that the first set of data DATA1 has not been stored in the storage device A.

In Step S13B, through executing the specific command such as the compare command or the verify command, the storage device B may compare or verify, for example, compare the first set of data DATA1 with the existing information stored in the storage device B or verify existence of the first set of data DATA1 in the storage device B. According to this embodiment, in response to the first internal request IR1 (A, DATA1, LBA1), the storage server 10 may utilize the storage device B to perform another first detection operation of the first set of data DATA1 on the existing information stored in the storage device B (e.g. by executing the specific command such as the compare command or the verify command) to generate another first detection result, where the other first detection result may indicate whether the first set of data DATA1 has been stored in the storage device B. For example, the other first detection result may indicate that the first set of data DATA1 has not been stored in the storage device B.

In Step S14, the storage device A may write the first set of data DATA1 at the first LBA LBA1. According to this embodiment, in response to the first detection result indicating that the first set of data DATA1 has not been stored in the storage device A, the storage server 10 may utilize the storage device A to store the first set of data DATA1. More particularly, when none of the first detection results (e.g. the first detection result of the storage device A and the other first detection result of the storage device B) corresponding to the first internal request IR1 (A, DATA1, LBA1) indicate that the first set of data DATA1 has been stored within the storage server 10, the storage device A may store the first set of data DATA1 at the first LBA LBA1 according to the first internal request IR1 (A, DATA1, LBA1) by default.

Figure 6:
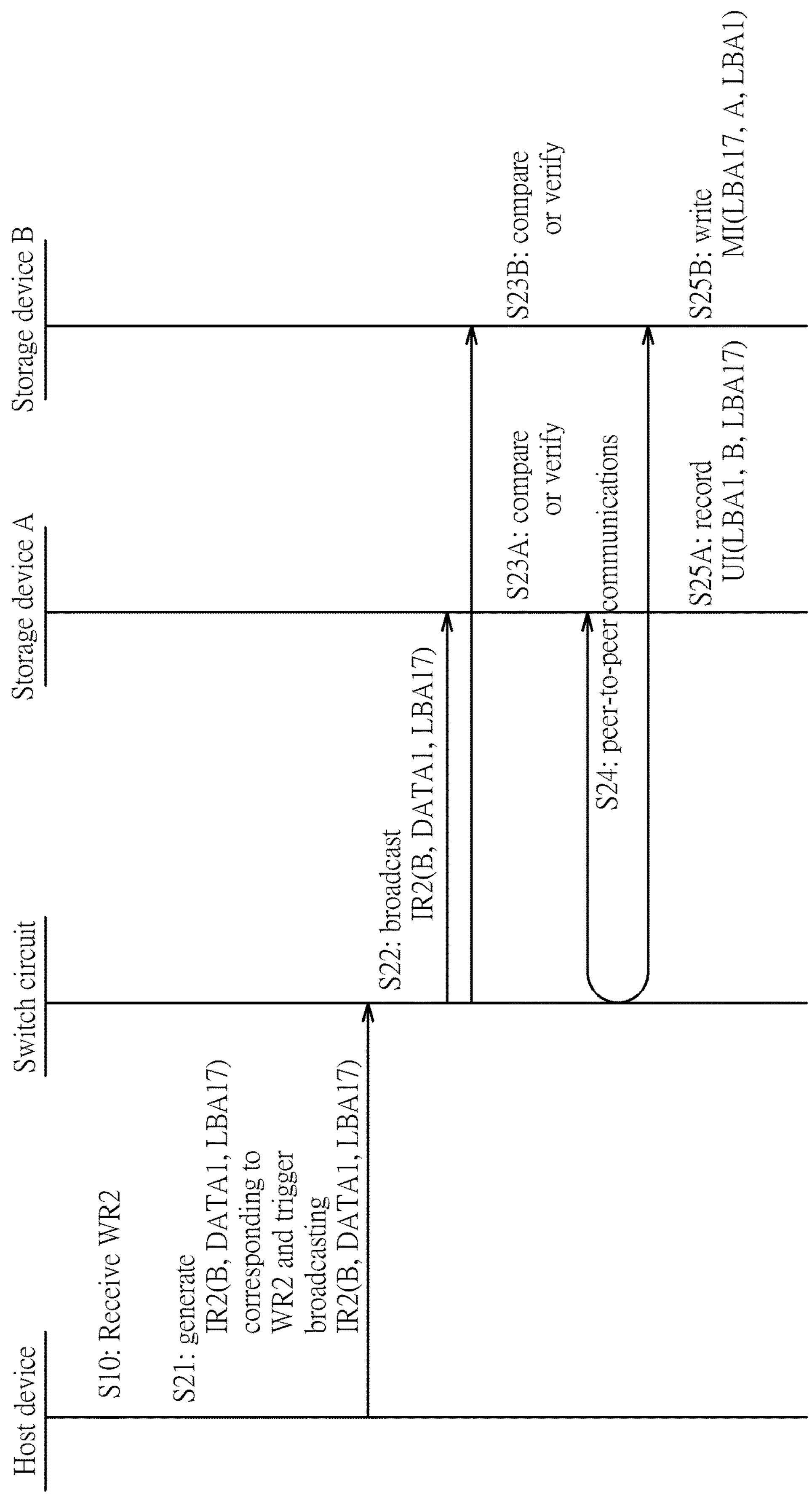
FIG. 6 illustrates a write control scheme of the method according to another embodiment of the present invention.

FIG. 6 illustrates a write control scheme of the method according to another embodiment of the present invention. For example, the plurality of client requests may comprise the first write request WR1 and the second write request WR2, where the storage server 10 may receive the first write request WR1 first, and receive the second write request WR2 afterward. The second write request WR2 may be arranged to write the first set of data DATA1 at the second LBA such as LBA17, and the second internal request IR2 (B, DATA1, LBA17) may indicate writing the first set of data DATA1 at the second LBA LBA17 into the storage device B within the plurality of storage devices 90.

In Step S20, the storage server 10 may receive the second write request WR2.

In Step S21, the host device 50 may generate the second internal request IR2 (B, DATA1, LBA17) corresponding to the second write request WR2 and trigger broadcasting the second internal request IR2 (B, DATA1, LBA17).

In Step S22, the switch circuit 70 may broadcast the second internal request IR2 (B, DATA1, LBA17), and more particularly, send the second internal request IR2 (B, DATA1, LBA17) to both of the storage device A and the storage device B.

In Step S23A, through executing the specific command such as the compare command or the verify command, the storage device A may compare or verify, for example, compare the first set of data DATA1 with the latest version of the existing information stored in the storage device A or verify existence of the first set of data DATA1 in the storage device A. According to this embodiment, in response to the second internal request IR2 (B, DATA1, LBA17), the storage server 10 may utilize the storage device A to perform a second detection operation of the first set of data DATA1 on the latest version of the existing information stored in the storage device A (e.g. by executing the specific command such as the compare command or the verify command) to generate a second detection result, where the second detection result may indicate whether the first set of data DATA1 has been stored in the storage device A. For example, the second detection result may indicate that the first set of data DATA1 has been stored in the storage device A.

In Step S23B, through executing the specific command such as the compare command or the verify command, the storage device B may compare or verify, for example, compare the first set of data DATA1 with the latest version of the existing information stored in the storage device B or verify existence of the first set of data DATA1 in the storage device B. According to this embodiment, in response to the second internal request IR2 (B, DATA1, LBA17), the storage server 10 may utilize the storage device B to perform another second detection operation of the first set of data DATA1 on the latest version of the existing information stored in the storage device B (e.g. by executing the specific command such as the compare command or the verify command) to generate another second detection result, where the other second detection result may indicate whether the first set of data DATA1 has been stored in the storage device B. For example, the other second detection result may indicate that the first set of data DATA1 has not been stored in the storage device B.

In Step S24, the storage device A and the storage device B may perform peer-to-peer communications. According to this embodiment, in response to the second detection result indicating that the first set of data DATA1 has been stored in the storage device A, the storage server 10 may utilize the storage device A to output associated information corresponding to the second detection result, to prevent the first set of data DATA1 from being stored into the storage device B. For example, in response to the second detection result, the storage server 10 may utilize the storage device A to communicate with the storage device B through the peer-to-peer communications, and utilize the storage device B to store mapping information MI (LBA17, A, LBA1) pointing toward the first set of data DATA1 stored in the storage device A, where the mapping information MI (LBA17, A, LBA1) may represent a mapping relationship between the second LBA LBA17 and the first LBA LBA1 associated with the storage device A. When the storage device B stores the mapping information MI (LBA17, A, LBA1) pointing toward the first set of data DATA1 stored in the storage device A, the storage server 10 may utilize the storage device A to record usage information UI (LBA1, B, LBA17) of the first set of data DATA1, where the usage information UI (LBA1, B, LBA17) may indicate that the first set of data DATA1 stored in the storage device A is used by the storage device B.

In Step S25A, the storage device A may record the usage information UI (LBA1, B, LBA17) of the first set of data DATA1.

In Step S25B, the storage device B may write the mapping information MI (LBA17, A, LBA1).

Figure 7:
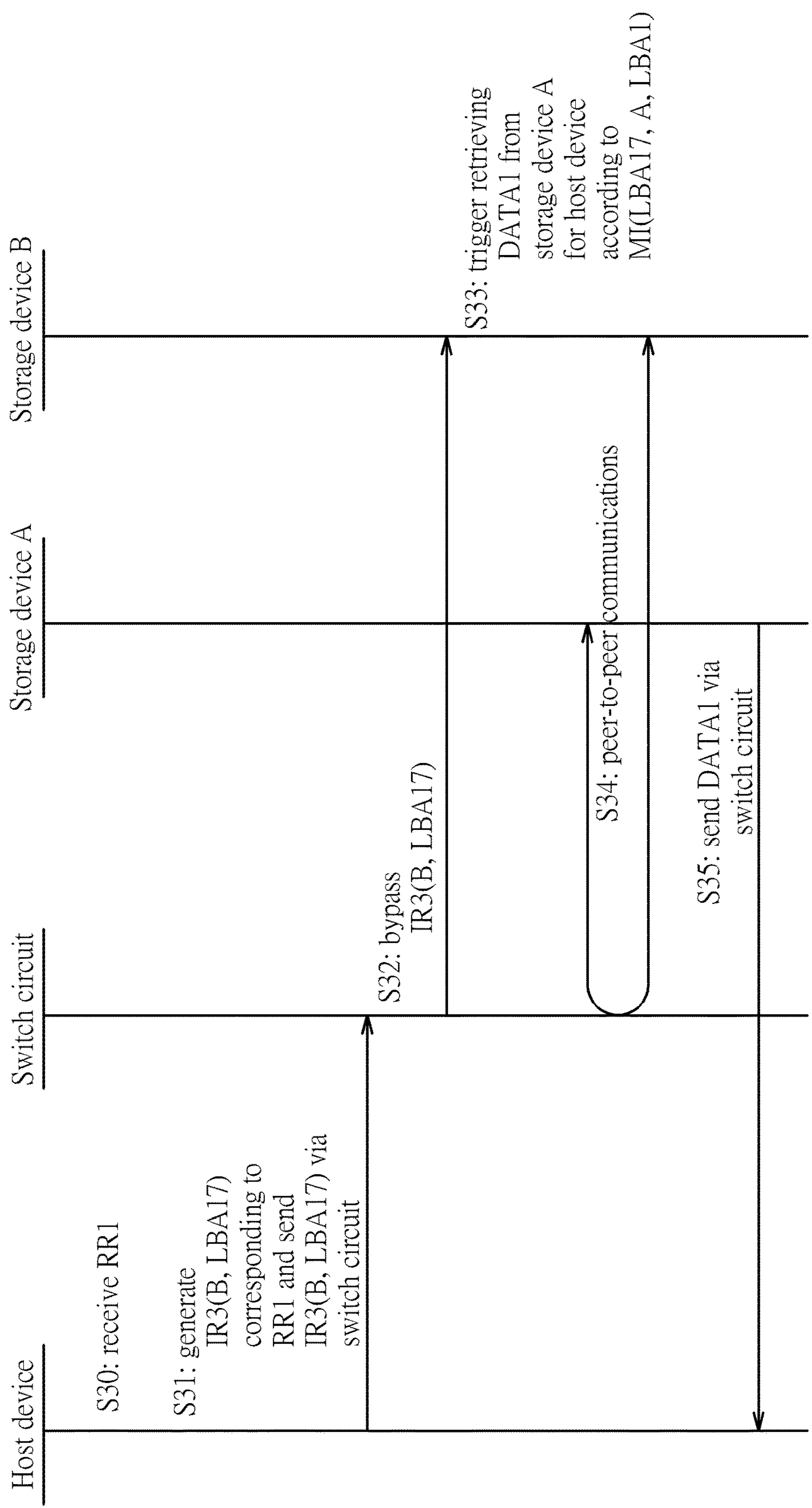
FIG. 7 illustrates a read control scheme of the method according to an embodiment of the present invention.

FIG. 7 illustrates a read control scheme of the method according to an embodiment of the present invention. For example, the plurality of client requests may comprise the first write request WR1, the second write request WR2, and a read request RR1, where the storage server 10 may receive the first write request WR1 and the second write request WR2 first, and receive the read request RR1 afterward. The read request RR1 may be arranged to read the first set of data DATA1 at the second LBA LBA17.

In Step S30, the storage server 10 may receive the read request RR1.

In Step S31, the host device 50 may generate a third internal request IR3 (B, LBA17) corresponding to the read request RR1 and send the third internal request IR3 (B, LBA17) via the switch circuit 70, where the third internal request IR3 (B, LBA17) may indicate reading data (e.g. the first set of data DATA1) at the second LBA LBA17 from the storage device B.

In Step S32, the switch circuit 70 may bypass the third internal request IR3 (B, LBA17), and more particularly, send the third internal request IR3 (B, LBA17) to the storage device B.

In Step S33, the storage device B may trigger retrieving the first set of data DATA1 from the storage device A for the host device 50 according to the mapping information MI (LBA17, A, LBA1). According to this embodiment, in response to the read request RR1, the storage server 10 may utilize the storage device B to trigger retrieving the first set of data DATA1 from the storage device A for the host device 50 according to the mapping information MI (LBA17, A, LBA1). For example, when detecting the mapping information MI (LBA17, A, LBA1), the storage device B may ask the storage device A to read the first set of data DATA1 for the storage device B, and more particularly, ask the storage device A to send the first set of data DATA1 to the host device 50 for the storage device B, but the present invention is not limited thereto.

In Step S34, the storage device A and the storage device B may perform peer-to-peer communications. According to this embodiment, when the mapping information MI (LBA17, A, LBA1) exists in the storage device B, the storage server 10 may utilize the storage device B to communicate with the storage device A through the peer-to-peer communications, and utilize the storage device B to ask the storage device A to send the first set of data DATA1 to the host device 50 for the storage device B.

In Step S35, the storage device A may send the first set of data DATA1 via the switch circuit 70, and more particularly, return the first set of data DATA1 to the host device 50 via the switch circuit 70 for the storage device B.

Figure 8:
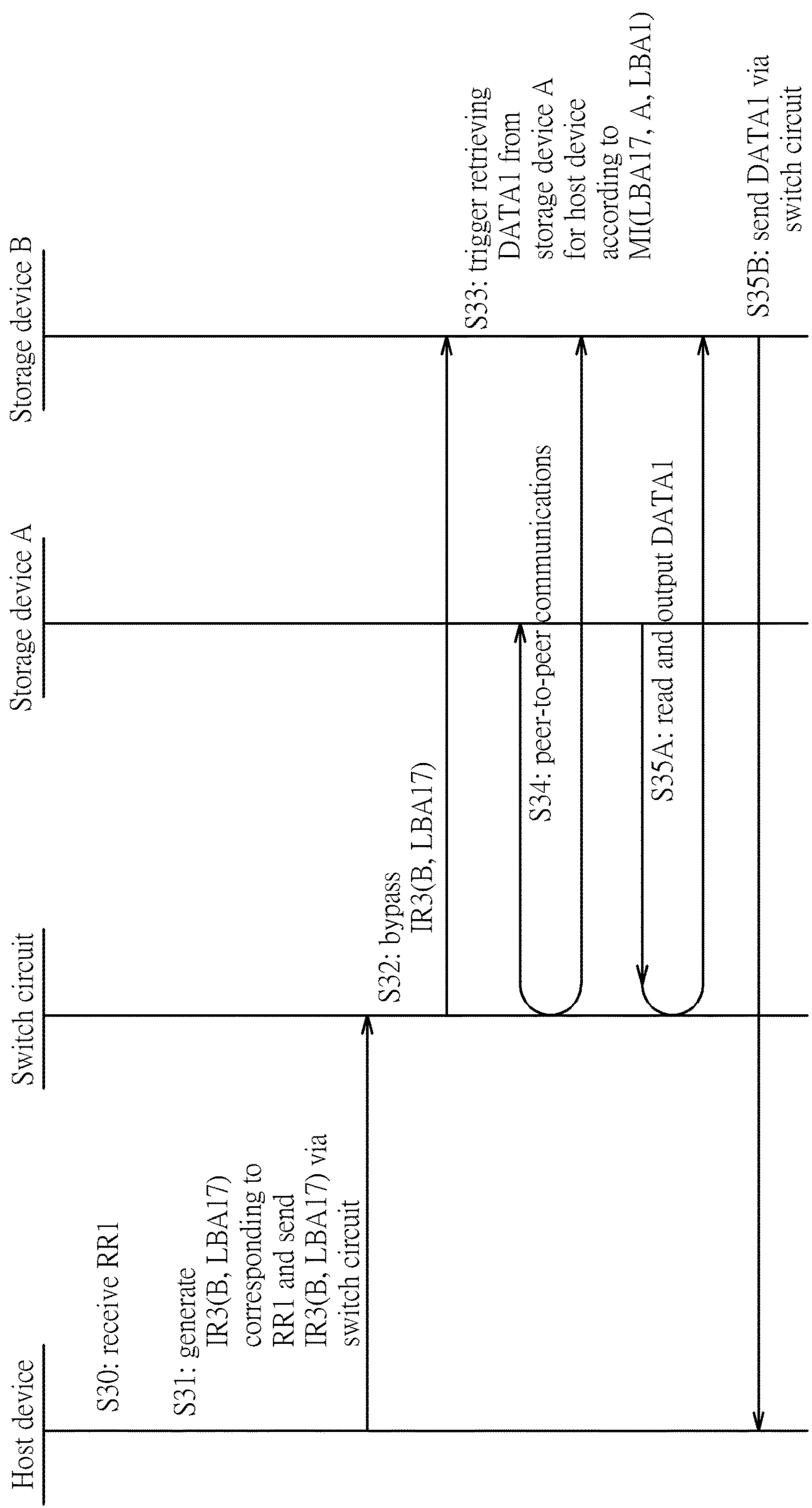
FIG. 8 illustrates a read control scheme of the method according to another embodiment of the present invention.

FIG. 8 illustrates a read control scheme of the method according to another embodiment of the present invention. For example, the plurality of client requests may comprise the first write request WR1, the second write request WR2, and the read request RR1, where the storage server 10 may receive the first write request WR1 and the second write request WR2 first, and receive the read request RR1 afterward. The read request RR1 may be arranged to read the first set of data DATA1 at the second LBA LBA17.

In Step S30, the storage server 10 may receive the read request RR1.

In Step S31, the host device 50 may generate the third internal request IR3 (B, LBA17) corresponding to the read request RR1 and send the third internal request IR3 (B, LBA17) via the switch circuit 70, where the third internal request IR3 (B, LBA17) may indicate reading data (e.g. the first set of data DATA1) at the second LBA LBA17 from the storage device B.

In Step S32, the switch circuit 70 may bypass the third internal request IR3 (B, LBA17), and more particularly, send the third internal request IR3 (B, LBA17) to the storage device B.

In Step S33, the storage device B may trigger retrieving the first set of data DATA1 from the storage device A for the host device 50 according to the mapping information MI (LBA17, A, LBA1). According to this embodiment, in response to the read request RR1, the storage server 10 may utilize the storage device B to trigger retrieving the first set of data DATA1 from the storage device A for the host device 50 according to the mapping information MI (LBA17, A, LBA1). For example, when detecting the mapping information MI (LBA17, A, LBA1), the storage device B may retrieve the first set of data DATA1 from the storage device A according to the mapping information MI (LBA17, A, LBA1) for the host device 50.

In Step S34, the storage device A and the storage device B may perform peer-to-peer communications. According to this embodiment, when the mapping information MI (LBA17, A, LBA1) exists in the storage device B, the storage server 10 may utilize the storage device B to communicate with the storage device A through the peer-to-peer communications, and utilize the storage device B to ask the storage device A to read the first set of data DATA for the storage device B. As a result, the storage device B may retrieve the first set of data DATA1 from the storage device A and return the first set of data DATA1 to the host device 50.

In Step S35A, the storage device A may read and output the first set of data DATA1, and more particularly, send the first set of data DATA1 to the storage device B via the switch circuit 70.

In Step S35B, the storage device B may send the first set of data DATA1 via the switch circuit 70, and more particularly, return the first set of data DATA1 to the host device 50 via the switch circuit 70.

Figure 9:
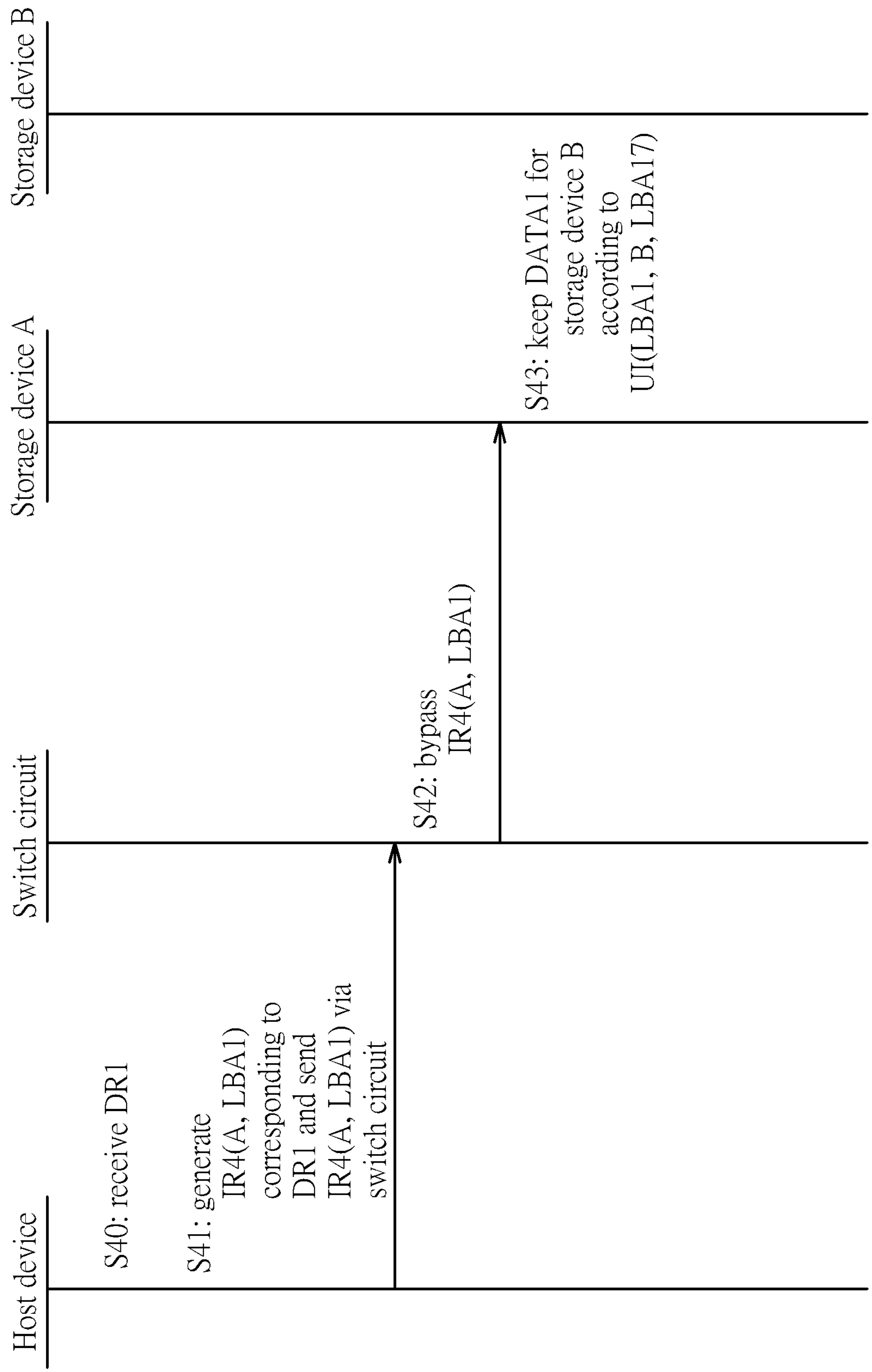
FIG. 9 illustrates a delete control scheme of the method according to an embodiment of the present invention.

FIG. 9 illustrates a delete control scheme of the method according to an embodiment of the present invention. For example, the plurality of client requests may comprise the first write request WR1, the second write request WR2, the read request RR1, and a delete request DR1, where the storage server 10 may receive the first write request WR1, the second write request WR2, and the read request RR1 first, and receive the delete request DR1 afterward. The delete request DR1 may be arranged to delete the first set of data DATA1 at the first LBA LBA1.

In Step S40, the storage server 10 may receive the delete request DR1.

In Step S41: the host device 50 may generate a fourth internal request IR4 (A, LBA1) corresponding to the delete request DR1 and send the fourth internal request IR4 (A, LBA1) via the switch circuit 70, where the fourth internal request IR4 (A, LBA1) may indicate deleting data (e.g. the first set of data DATA1) at the first LBA LBA1 within the storage device A.

In Step S42, the switch circuit 70 may bypass the fourth internal request IR4 (A, LBA1), and more particularly, send the fourth internal request IR4 (A, LBA1) to the storage device A.

In Step S43, when detecting the usage information UI (LBA1, B, LBA17), the storage device A may keep the first set of data DATA1 for the storage device B according to the usage information UI (LBA1, B, LBA17).

Figure 10:
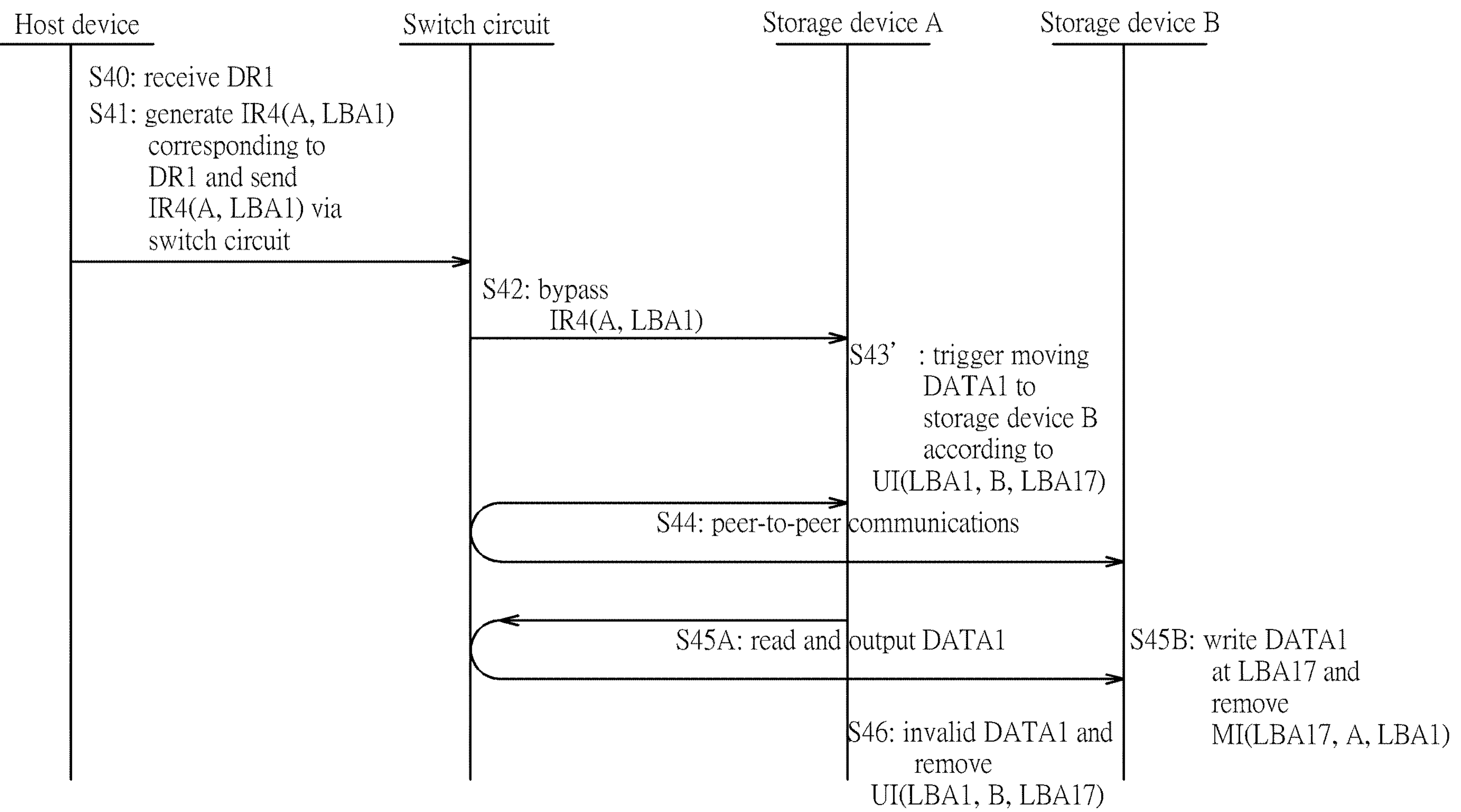
FIG. 10 illustrates a delete control scheme of the method according to another embodiment of the present invention.

FIG. 10 illustrates a delete control scheme of the method according to another embodiment of the present invention. For example, the plurality of client requests may comprise the first write request WR1, the second write request WR2, the read request RR1, and the delete request DR1, where the storage server 10 may receive the first write request WR1, the second write request WR2, and the read request RR1 first, and receive the delete request DR1 afterward. The delete request DR1 may be arranged to delete the first set of data DATA1 at the first LBA LBA1.

In Step S40, the storage server 10 may receive the delete request DR1.

In Step S41: the host device 50 may generate the fourth internal request IR4 (A, LBA1) corresponding to the delete request DR1 and send the fourth internal request IR4 (A, LBA1) via the switch circuit 70, where the fourth internal request IR4 (A, LBA1) may indicate deleting data (e.g. the first set of data DATA1) at the first LBA LBA1 within the storage device A.

In Step S42, the switch circuit 70 may bypass the fourth internal request IR4 (A, LBA1), and more particularly, send the fourth internal request IR4 (A, LBA1) to the storage device A.

In Step S43', when detecting the usage information UI (LBA1, B, LBA17), the storage device A may trigger moving the first set of data DATA1 to the storage device B according to the usage information UI (LBA1, B, LBA17).

In Step S44, the storage device A and the storage device B may perform peer-to-peer communications. According to this embodiment, when the usage information UI (LBA1, B, LBA17) exists in the storage device A, the storage server 10 may utilize the storage device A to communicate with the storage device B through the peer-to-peer communications, and utilize the storage device A to ask the storage device B to keep and store the first set of data DATA1 by itself.

In Step S45A, the storage device A may read and output the first set of data DATA1, and more particularly, send the first set of data DATA1 to the storage device B via the switch circuit 70.

In Step S45B, the storage device B may write the first set of data DATA1 at the second LBA LBA17 and remove the mapping information MI (LBA17, A, LBA1).

In Step S46, the storage device A may invalid the first set of data DATA1 and remove the usage information UI (LBA1, B, LBA17).

Figure 11:
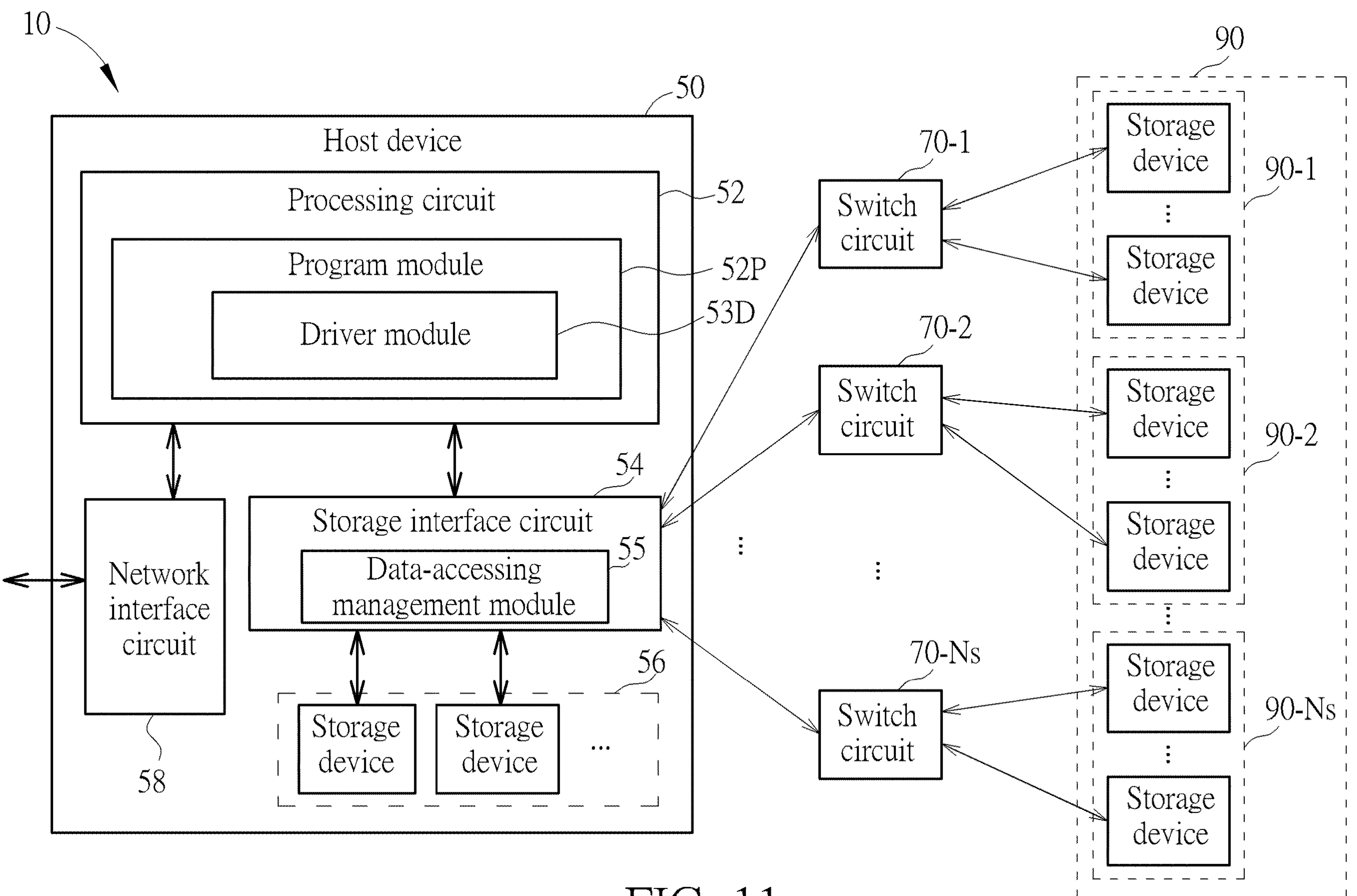
FIG. 11 is a diagram of a storage server according to another embodiment of the present invention.

FIG. 11 is a diagram of a storage server according to another embodiment of the present invention. In comparison with the architecture shown in FIG. 1, the storage interface circuit 54 of this embodiment may comprise a data-accessing management module 55 for controlling the host device 50 to operate according to the method, and a driver module 53D running on the processing circuit 52 may be arranged to communicate with the data-accessing management module 55, in order to perform one or more associated settings when needed, where the data-accessing management module 55 may be implemented as a sub-circuit of the storage interface circuit 54, such as an application-specific integrated circuit (ASIC), but the present invention is not limited thereto. For better comprehension, the host device 50 and the associated circuits/modules/devices in the architecture shown in the left-hand side of FIG. 11 (e.g. the processing circuit 52 running the program modules 52P, and the storage interface circuit 54 comprising the data-accessing management module 55) may be taken as examples of the aforementioned host device and the associated circuits/modules/devices thereof (e.g. the processing circuit running the one or more program modules corresponding to the method, and the storage interface circuit comprising the one or more sub-circuits corresponding to the method), respectively. For brevity, similar descriptions for this embodiment are not repeated in detail here.

According to some embodiments, the driver module 53D may be omitted. For example, the program module 52P may comprise a newer version of the OS, and it is unnecessary to install the driver module 53D into the host device 50. For brevity, similar descriptions for these embodiments are not repeated in detail here.

According to some embodiments, the control circuit (e.g. the storage interface circuit 54 comprising the data-accessing management module 55 as shown in FIG. 11) may be implemented to be a storage interface card (e.g. a hardware acceleration card) for being installed in the host device 50. For brevity, similar descriptions for these embodiments are not repeated in detail here.

According to some embodiments, in response to another client request of writing a second set of data DATA2 into the storage server 10, the storage server 10 may utilize the host device 50 to trigger broadcasting another internal request corresponding to the other client request toward the aforementioned each storage device of the plurality of storage devices 90, such as the storage device 100. For example, the host device 50 may receive the other client request from the client device, but the present invention is not limited thereto. In another example, in a situation where the one or more client devices comprise a plurality of client devices, the host device 50 may receive the other client request from another client device within the plurality of client devices. Further, in response to the other internal request corresponding to the other client request, the storage server 10 may utilize the aforementioned each storage device of the plurality of storage devices 90, such as the storage device 100, to search for the second set of data DATA2 in the aforementioned each storage device (e.g. the storage device 100) to determine whether the second set of data DATA2 has been stored in any storage device of the plurality of storage devices 90 (e.g. the storage device 100), for controlling the storage server 10 completing the other client request without duplication of the second set of data DATA2 within the storage server 10. For brevity, similar descriptions for these embodiments are not repeated in detail here.

Figure 12:
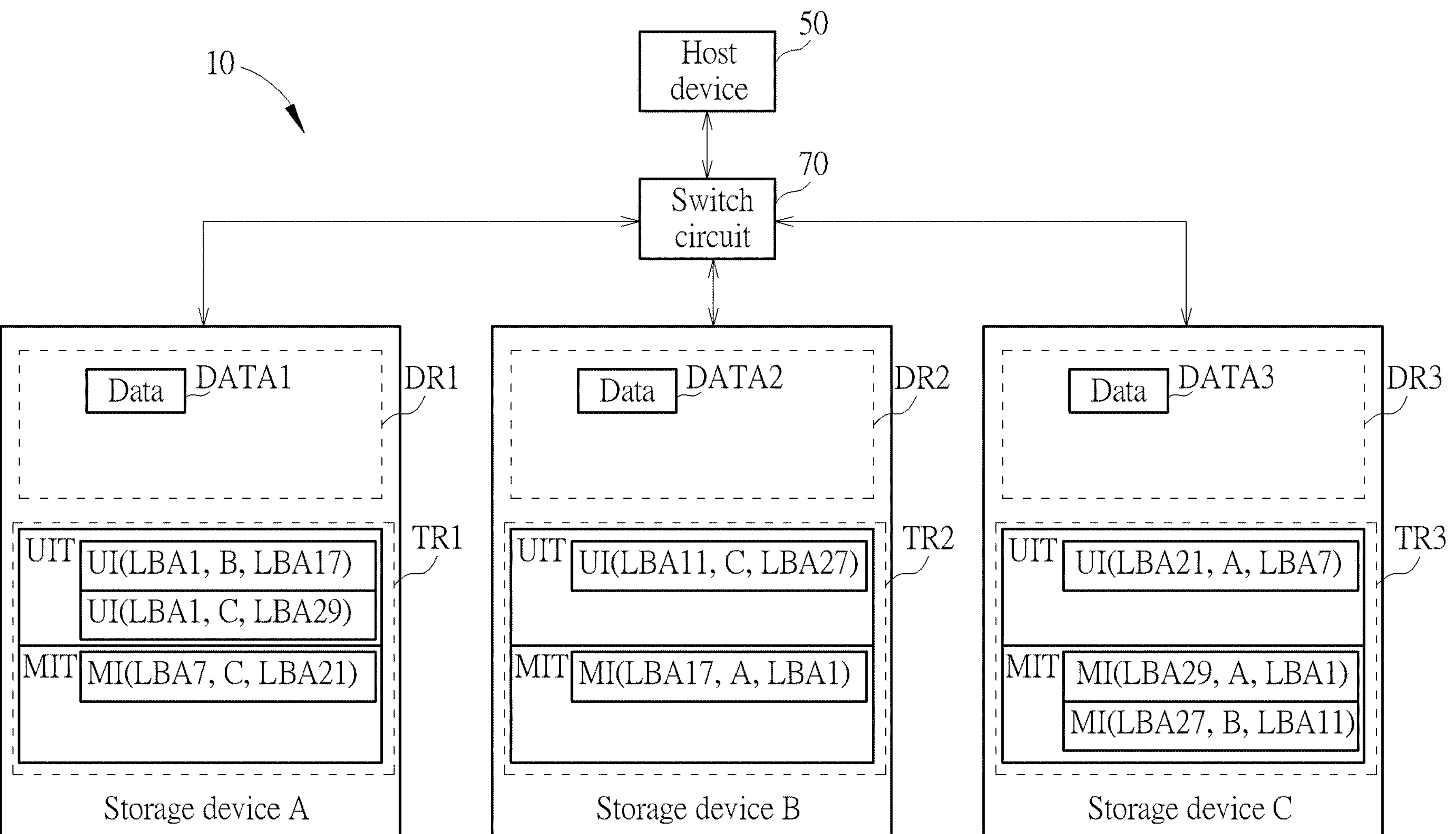
FIG. 12 illustrates some information tables involved with the method according to an embodiment of the present invention.

FIG. 12 illustrates some information tables involved with the method according to an embodiment of the present invention. The storage devices 100A and 100B shown in FIG. 4 may be respectively referred to as the storage device A and the storage device B for brevity, and another storage device within the plurality of storage devices 90 may be referred to as the storage device C, where the storage device C may be implemented according to the architecture of the storage device 100.

As shown in FIG. 12, the storage device A may comprise a data region DR1 and a table region TR1, the storage device B may comprise a data region DR2 and a table region TR2, and the storage device C may comprise a data region DR3 and a table region TR3. For example, the storage device A may store data such as the first set of data DATA1 into the data region DR1 and store one or more tables such as a usage information table (UIT) and a mapping information table (MIT) into the table region TR1, the storage device B may store data such as the second set of data DATA2 into the data region DR2 and store one or more tables such as a UIT and an MIT into the table region TR2, and the storage device C may store data such as a third set of data DATA3 into the data region DR3 and store one or more tables such as a UIT and an MIT into the table region TR3.

As the method can be applied to each of the storage devices A, B, and C, each of the storage devices A, B, and C may record the associated usage information and the associated mapping information in the UIT and the MIT thereof, respectively. For example, the storage device A may store the associated usage information such as UI (LBA1, B, LBA17), UI (LBA1, C, LBA29), etc. and the associated mapping information such as MI (LBA7, C, LBA21), etc. into the UIT and the MIT in the table region TR1, respectively. For another example, the storage device B may store the associated usage information such as UI (LBA11, C, LBA27), etc. and the associated mapping information such as MI (LBA17, A, LBA1), etc. into the UIT and the MIT in the table region TR2, respectively. For yet another example, the storage device C may store the associated usage information such as UI (LBA21, A, LBA7), etc. and the associated mapping information such as MI (LBA29, A, LBA1), MI (LBA27, B, LBA11), etc. into the UIT and the MIT in the table region TR3, respectively.

According to this embodiment, each of the storage devices A, B, and C may store one or more sets of data for one or more other storage devices within the plurality of storage devices 90. For example, the storage device A may store the first set of data DATA1 for the storage devices B and C, the storage device B may store the second set of data DATA2 for the storage device C, and the storage device C may store the third set of data DATA3 for the storage device A. Regarding the storage device A storing the first set of data DATA1 for the storage device C, an internal request corresponding to a write request may indicate writing the first set of data DATA1 at the LBA LBA29 into the storage device C. As a detection result of the storage device A indicates that the first set of data DATA1 has been stored in the storage device A, the storage device C may record the mapping information MI (LBA29, A, LBA1) pointing toward the first set of data DATA1 stored at the first LBA LBA1 within the storage device A, where the mapping information MI (LBA29, A, LBA1) may represent a mapping relationship between the LBA LBA29 and the first LBA LBA1 associated with the storage device A. When the storage device C stores the mapping information MI (LBA29, A, LBA1) pointing toward the first set of data DATA1 stored in the storage device A, the storage device A may record the usage information UI (LBA1, C, LBA29) of the first set of data DATA1, where the usage information UI (LBA1, C, LBA29) may indicate that the first set of data DATA1 stored in the storage device A is used by the storage device C (e.g. for the LBA LBA29).

Regarding the storage device B storing the second set of data DATA2 for the storage device C, an internal request corresponding to a write request may indicate writing the second set of data DATA2 at the LBA LBA27 into the storage device C. As a detection result of the storage device B indicates that the second set of data DATA2 has been stored in the storage device B, the storage device C may record the mapping information MI (LBA27, B, LBA11) pointing toward the second set of data DATA2 stored at the LBA LBA11 within the storage device B, where the mapping information MI (LBA27, B, LBA11) may represent a mapping relationship between the LBA LBA27 and the LBA LBA11 associated with the storage device B. When the storage device C stores the mapping information MI (LBA27, B, LBA11) pointing toward the second set of data DATA2 stored in the storage device B, the storage device B may record the usage information UI (LBA11, C, LBA27) of the second set of data DATA2, where the usage information UI (LBA11, C, LBA27) may indicate that the second set of data DATA2 stored in the storage device B is used by the storage device C (e.g. for the LBA LBA27).

Regarding the storage device C storing the third set of data DATA3 for the storage device A, an internal request corresponding to a write request may indicate writing the third set of data DATA3 at the LBA LBA7 into the storage device A. As a detection result of the storage device C indicates that the third set of data DATA3 has been stored in the storage device C, the storage device A may record the mapping information MI (LBA7, C, LBA21) pointing toward the third set of data DATA3 stored at the LBA LBA21 within the storage device C, where the mapping information MI (LBA7, C, LBA21) may represent a mapping relationship between the LBA LBA7 and the LBA LBA21 associated with the storage device C. When the storage device A stores the mapping information MI (LBA7, C, LBA21) pointing toward the third set of data DATA3 stored in the storage device C, the storage device C may record the usage information UI (LBA21, A, LBA7) of the third set of data DATA3, where the usage information UI (LBA21, A, LBA7) may indicate that the third set of data DATA3 stored in the storage device C is used by the storage device A (e.g. for the LBA LBA7).

According to some embodiments, the host device 50 may be arranged to merge the plurality of storage devices 90 into an all flash array (AFA) system. For example, the client request mentioned in Step 210 may be arranged to write the first set of data DATA1 at the first LBA, and the internal request may indicate writing the first set of data DATA1 at the first LBA into the storage device A within the plurality of storage devices 90. In addition, the storage server 10 may utilize the host device 50 to assign the first storage device (e.g. the storage device A) as a physical device for storing the first set of data DATA1 at the first LBA. More particularly, the other client request may be arranged to write the second set of data DATA2 at the second LBA, and the other internal request may indicate writing the second set of data DATA2 at the second LBA into the storage device B within the plurality of storage devices 90. Further, the storage server 10 may utilize the host device 50 to assign the second storage device (e.g. the storage device B) as a physical device for storing the second set of data DATA2 at the second LBA.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data-accessing management in a storage server, the method being applied to the storage server, the method comprising:

in response to a client request of writing a first set of data into the storage server, utilizing a host device within the storage server to trigger broadcasting an internal request corresponding to the client request toward each storage device of a plurality of storage devices within the storage server, wherein the storage server comprises the host device and the plurality of storage devices that are coupled to the host device, the host device is arranged to control operations of the storage server, and the plurality of storage devices are arranged to store information for the storage server; and in response to the internal request corresponding to the client request, utilizing said each storage device of the plurality of storage devices to search for the first set of data in said each storage device to determine whether the first set of data has been stored in any storage device of the plurality of storage devices, for controlling the storage server completing the client request without duplication of the first set of data within the storage server.

2. The method of claim 1, wherein if the first set of data has been stored in any of the plurality of storage devices, the storage server completes the client request without writing the first set of data into the plurality of storage devices again, otherwise, the storage server completes the client request by writing the first set of data into one of the plurality of storage devices.

3. The method of claim 1, wherein the storage server comprises at least one switch circuit coupled between the host device and the plurality of storage devices; and the method further comprises:

utilizing said at least one switch circuit to send the internal request to all of the plurality of storage devices.

4. The method of claim 3, wherein the host device, said at least one switch circuit, and the plurality of storage devices at least conform to Peripheral Component Interconnect Express (PCIe) specification; and utilizing said at least one switch circuit to send the internal request to all of the plurality of storage devices further comprises:

utilizing said at least one switch circuit to send the internal request to all of the plurality of storage devices through a broadcast function of said at least one switch circuit.

5. The method of claim 1, wherein the internal request comprises a specific command; and utilizing said each storage device of the plurality of storage devices to search for the first set of data in said each storage device to determine whether the first set of data has been stored in said any storage device for controlling the storage server completing the client request without the duplication of the first set of data within the storage server further comprises:

in response to the specific command within the internal request, utilizing said any storage device to execute the specific command to perform a detection operation of the first set of data on existing information stored in said any storage device to generate a detection result, wherein the detection result indicates whether the first set of data has been stored in said any storage device.

6. The method of claim 5, wherein the host device and the plurality of storage devices at least conform to Peripheral Component Interconnect Express (PCIe) specification; and the specific command is a compare command conforming to Non-Volatile Memory Express (NVMe) specification.

7. The method of claim 5, wherein the host device and the plurality of storage devices at least conform to Peripheral Component Interconnect Express (PCIe) specification; and the specific command is a verify command conforming to Serial Advanced Technology Attachment (Serial ATA, or SATA) specification or Parallel ATA (PATA) specification.

8. The method of claim 1, wherein the storage server receives a first write request and a second write request from outside the storage server, and the client request represents any of the first write request and the second write request; and the host device triggers broadcasting a first internal request and a second internal request respectively corresponding to the first write request and the second write request toward said each storage device of the plurality of storage devices, and the internal request represents one of the first and the second internal requests that corresponds to said any of the first write request and the second write request.

9. The method of claim 8, wherein the first write request is arranged to write the first set of data at a first logical block address (LBA), and the first internal request indicates writing the first set of data at the first LBA into a first storage device within the plurality of storage devices; and the method further comprises:

in response to the first internal request, utilizing the first storage device to perform a first detection operation of the first set of data on existing information stored in the first storage device to generate a first detection result, wherein the first detection result indicates whether the first set of data has been stored in the first storage device.

10. The method of claim 9, wherein the storage server comprises a switch circuit that is coupled between the host device and each of the first storage device and a second storage device within the plurality of storage devices; and the method further comprises:

utilizing the switch circuit to send the first internal request to both of the first storage device and the second storage device.

11. The method of claim 9, further comprising:

in response to the first detection result indicating that the first set of data has not been stored in the first storage device, utilizing the first storage device to store the first set of data.

12. The method of claim 9, wherein the storage server receives the first write request first, and receives the second write request afterward; the second write request is arranged to write the first set of data at a second LBA, and the second internal request indicates writing the first set of data at the second LBA into a second storage device within the plurality of storage devices; and the method further comprises:

in response to the second internal request, utilizing the first storage device to perform a second detection operation of the first set of data on a latest version of the existing information stored in the first storage device to generate a second detection result, wherein the second detection result indicates whether the first set of data has been stored in the first storage device.

13. The method of claim 12, wherein the storage server comprises a switch circuit that is coupled between the host device and each of the first storage device and the second storage device; and the method further comprises:

utilizing the switch circuit to send the first internal request to both of the first storage device and the second storage device; and utilizing the switch circuit to send the second internal request to both of the first storage device and the second storage device.

14. The method of claim 12, further comprising:

in response to the second detection result indicating that the first set of data has been stored in the first storage device, utilizing the first storage device to output associated information corresponding to the second detection result, to prevent the first set of data from being stored into the second storage device.

15. The method of claim 12, further comprising:

in response to the second detection result indicating that the first set of data has been stored in the first storage device, utilizing the first storage device to communicate with the second storage device through peer-to-peer communications, and utilizing the second storage device to store mapping information pointing toward the first set of data stored in the first storage device, wherein the mapping information represents a mapping relationship between the second LBA and the first LBA associated with the first storage device.

16. The method of claim 15, further comprising:

in response to the second storage device storing the mapping information pointing toward the first set of data stored in the first storage device, utilizing the first storage device to record usage information of the first set of data, wherein the usage information indicates that the first set of data stored in the first storage device is used by the second storage device.

17. The method of claim 15, wherein a read request is arranged to read the first set of data at the second LBA; and the method further comprises:

in response to the read request, utilizing the second storage device to trigger retrieving the first set of data from the first storage device for the host device according to the mapping information.

18. The method of claim 15, wherein a read request is arranged to read the first set of data at the second LBA; and the method further comprises:

in response to the read request, utilizing the second storage device to retrieve the first set of data from the first storage device according to the mapping information for the host device.

19. The method of claim 1, further comprising:

in response to another client request of writing a second set of data into the storage server, utilizing the host device to trigger broadcasting another internal request corresponding to the other client request toward said each storage device of the plurality of storage devices; and in response to the other internal request corresponding to the other client request, utilizing said each storage device of the plurality of storage devices to search for the second set of data in said each storage device to determine whether the second set of data has been stored in any storage device of the plurality of storage devices, for controlling the storage server completing the other client request without duplication of the second set of data within the storage server.

20. The method of claim 1, wherein the host device is arranged to merge the plurality of storage devices into an all flash array (AFA) system; the client request is arranged to write the first set of data at a first logical block address (LBA), and the internal request indicates writing the first set of data at the first LBA into a first storage device within the plurality of storage devices; and the method further comprises:

utilizing the host device to assign the first storage device as a physical device for storing the first set of data at the first LBA.

21. A host device, comprising:

a control circuit, arranged to control the host device to perform data-accessing management in a storage server, wherein the storage server comprises the host device and a plurality of storage devices that are coupled to the host device, the host device is arranged to control operations of the storage server, and the plurality of storage devices are arranged to store information for the storage server, wherein:

in response to a client request of writing a first set of data into the storage server, the host device triggers broadcasting an internal request corresponding to the client request toward each storage device of the plurality of storage devices; and through the internal request corresponding to the client request, the host device controls said each storage device of the plurality of storage devices to search for the first set of data in said each storage device to determine whether the first set of data has been stored in any storage device of the plurality of storage devices, for controlling the storage server completing the client request without duplication of the first set of data within the storage server.

22. The host device of claim 21, wherein if the first set of data has been stored in any of the plurality of storage devices, the storage server completes the client request without writing the first set of data into the plurality of storage devices again, otherwise, the storage server completes the client request by writing the first set of data into one of the plurality of storage devices.

23. A storage device, comprising:

a non-volatile (NV) memory, wherein the NV memory comprises at least one NV memory element; and a memory controller, arranged to control accessing of the NV memory, to allow a host device to access the NV memory through the memory controller, for performing data-accessing management in a storage server, wherein the storage server comprises the host device and a plurality of storage devices that are coupled to the host device, the host device is arranged to control operations of the storage server, and the plurality of storage devices are arranged to store information for the storage server, wherein:

in response to a client request of writing a first set of data into the storage server, the host device triggers broadcasting an internal request corresponding to the client request toward each storage device of the plurality of storage devices, wherein the plurality of storage devices comprise the storage device; and in response to the internal request corresponding to the client request, said each storage device of the plurality of storage devices searches for the first set of data in said each storage device to determine whether the first set of data has been stored in any storage device of the plurality of storage devices, for controlling the storage server completing the client request without duplication of the first set of data within the storage server.

24. The storage device of claim 23, wherein if the first set of data has been stored in any of the plurality of storage devices, the storage server completes the client request without writing the first set of data into the plurality of storage devices again, otherwise, the storage server completes the client request by writing the first set of data into one of the plurality of storage devices.

25. The storage device of claim 23, wherein the storage server receives a first write request and a second write request from outside the storage server, and the client request represents any of the first write request and the second write request; and the host device triggers broadcasting a first internal request and a second internal request respectively corresponding to the first write request and the second write request toward said each storage device of the plurality of storage devices, and the internal request represents one of the first and the second internal requests that corresponds to said any of the first write request and the second write request.

26. The storage device of claim 25, wherein the first write request is arranged to write the first set of data at a first logical block address (LBA), and the first internal request indicates writing the first set of data at the first LBA into a first storage device within the plurality of storage devices, wherein the storage device represents the first storage device; and in response to the first internal request, the first storage device performs a first detection operation of the first set of data on existing information stored in the first storage device to generate a first detection result, wherein the first detection result indicates whether the first set of data has been stored in the first storage device.

27. The storage device of claim 25, wherein the storage server receives the first write request first, and receives the second write request afterward; the first and the second write requests are arranged to write the first set of data at a first logical block address (LBA) and a second LBA, respectively, and the first and the second internal requests indicate writing the first set of data at the first LBA into a first storage device within the plurality of storage devices and writing the first set of data at the second LBA into a second storage device within the plurality of storage devices, respectively, wherein the storage device represents the second storage device; in response to the first internal request, the first storage device performs a first detection operation of the first set of data on existing information stored in the first storage device to generate a first detection result, wherein the first detection result indicates whether the first set of data has been stored in the first storage device; in response to the second internal request, the first storage device performs a second detection operation of the first set of data on a latest version of the existing information stored in the first storage device to generate a second detection result, wherein the second detection result indicates whether the first set of data has been stored in the first storage device; and the second storage device stores mapping information pointing toward the first set of data stored in the first storage device, wherein the mapping information represents a mapping relationship between the second LBA and the first LBA associated with the first storage device.

28. A controller of a storage device, the storage device comprising the controller and a non-volatile (NV) memory, the NV memory comprising at least one NV memory element, the controller comprising:

a processing circuit, arranged to control operations of the controller for controlling accessing of the NV memory, to allow a host device to access the NV memory through the controller, for performing data-accessing management in a storage server, wherein the storage server comprises the host device and a plurality of storage devices that are coupled to the host device, the host device is arranged to control operations of the storage server, and the plurality of storage devices are arranged to store information for the storage server, wherein:

in response to a client request of writing a first set of data into the storage server, the host device triggers broadcasting an internal request corresponding to the client request toward each storage device of the plurality of storage devices, wherein the plurality of storage devices comprise the storage device; and in response to the internal request corresponding to the client request, said each storage device of the plurality of storage devices searches for the first set of data in said each storage device to determine whether the first set of data has been stored in any storage device of the plurality of storage devices, for controlling the storage server completing the client request without duplication of the first set of data within the storage server.

* * * * *